United States Patent [19]
Bender et al.

[11] Patent Number: 5,277,117
[45] Date of Patent: Jan. 11, 1994

[54] UNDERWATER MINE COUNTERMEASURE WARFARE SYSTEM

[75] Inventors: Gregory L. Bender, Metairie; Cornelius Garner, New Orleans, both of La.; James A. Gleason, Waveland, Mich.

[73] Assignee: Textron, Inc., Providence, R.I.

[21] Appl. No.: 981,839

[22] Filed: Nov. 25, 1992

[51] Int. Cl.⁵ .................... F42B 22/42; B63G 7/06
[52] U.S. Cl. ....................... 102/402; 89/1.13
[58] Field of Search ............ 102/402, 403, 1.11, 102/1.13; 180/116, 126, 127; 89/1.13

[56] References Cited

U.S. PATENT DOCUMENTS

| | | | |
|---|---|---|---|
| 3,583,520 | 6/1971 | Kirpitznikoff | 180/127 |
| 3,906,884 | 9/1975 | Gould | 102/402 |
| 3,939,753 | 2/1976 | Rosborough et al. | 102/402 |
| 3,946,696 | 3/1976 | Lubnow | 89/1.13 |
| 4,397,366 | 8/1983 | Eldridge et al. | 180/116 |
| 4,697,522 | 10/1987 | Groschupp et al. | 102/402 |
| 4,821,829 | 4/1989 | Gilbert et al. | 180/127 |
| 4,961,181 | 10/1990 | Elliott | 102/402 |
| 4,969,399 | 11/1990 | Kish | 102/402 |
| 4,993,325 | 2/1991 | Slone et al. | 102/402 |

Primary Examiner—David H. Brown
Attorney, Agent, or Firm—Perman & Green

[57] ABSTRACT

An underwater mine warfare countermeasure system is disclosed in which an air cushion vehicle carries an acoustic transmitter for sending out an acoustic wave pattern capable of exploding mines having acoustic responsive detonators. The vehicle includes a transmitter retraction apparatus for raising and lowering the transmitter between a storage position located just beneath the vehicle and an operative position spaced remotely from the vehicle, and also from raising the transmitter through an opening in the vehicle for placing it in an access position on the vehicle. The vehicle also includes an air seal or pressure boundary assembly which normally forms an air-tight cover for the aforementioned opening while still permitting the transmitter to be deployed to the operative position and retracted to the storage position while the vehicle is on cushion, but which opens to permit removal of the transmitter to the access position when the vehicle is off-cushion.

8 Claims, 5 Drawing Sheets

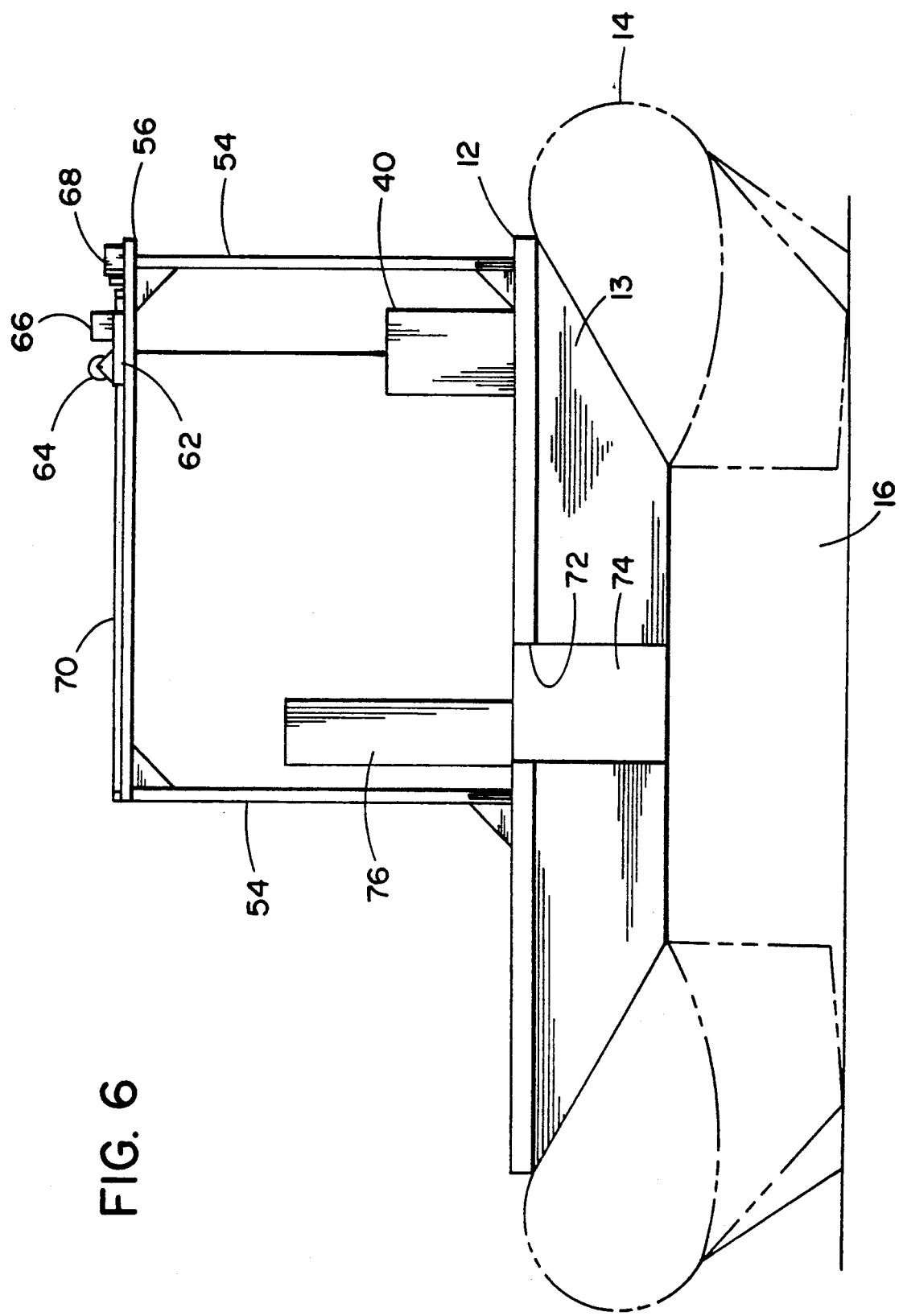

UNDERWATER MINE COUNTERMEASURE WARFARE SYSTEM

This invention relates generally to the field of underwater mine countermeasure warfare, and more particularly to an underwater mine countermeasure warfare system utilizing an air cushion vehicle equipped with an acoustic transmitter capable of emitting an acoustic wave pattern for exploding submerged mines having acoustically responsive detonators.

It has long been well known in the field of both land and sea warfare to set mines in strategic locations which will explode at an appropriate moment to destroy vehicles and land vehicles which are within the explosive range of the mines. In addition to mere contact between a vehicle and a mine, various techniques have been developed to cause the mines to explode remotely so that the vehicle suffers damage without actually contacting the mine. For example, some mines are provided with acoustically responsive detonators which cause the mines to explode when the detonator detects a predetermined sound wave pattern which simulates the sound pattern of a ship or other vehicle. Another example is mines which are provided with magnetically responsive detonators which cause the mines to explode when the detonator detects a predetermined magnetic field pattern which simulates the magnetic field or signature of an approaching ship. Some mines require a particular orientation and time rate of change of the magnetic field, the acoustic field or both, before they will explode.

However, with each new technological advance in the sophistication of detonating systems for mines, a countermeasure is soon developed for defeating the effectiveness of a new detonator. This is normally accomplished be devising systems which simulate the condition to which the detonator is responsive so that the mine is caused to explode harmlessly without damage to any nearby vehicles. For example, contact mines can be exploded by dragging various devices along the surface on which the mines are imbedded or floating, as the case may be, by a helicopter. Acoustic mines can be exploded by transmitting a pattern of acoustic waves which simulate the sound pattern of a vehicle or vehicle to which the detonator is responsive, such as the sound pattern emitted by the engines of a ship. Similarly, magnetic mines can be exploded by generating a magnetic field which simulates the magnetic signature of an approaching and/or departing vehicle or vehicles. This technique is particularly suitable to exploding underwater mines because large ships emit a distinctive magnetic field pattern because of both the large mass of metal and a variety of equipment which generates various magnetic field patterns. Often mines are designed to explode only after being exposed to a predetermined number of exposures to the critical parameters, which can be conveniently accomplished by an automated system to repetitively generate a field simulating a target ship's approaching or departure pattern.

A major problem with any system for simulating a condition to which a mine is responsive is that of bringing the simulating system into sufficiently close proximity to the mine to cause it to explode without damaging the vehicle used to transport the simulating system. Many solutions to this problem have been put forth from time to time, such as the use of helicopters as mentioned above or slow flying airplanes dragging or towing the condition simulating equipment, and land and sea vehicles equipped with the necessary simulating equipment which can function out of range of the explosive force of the mines.

Prior to the present invention, one solution in particular worked rather effectively as an underwater mine countermeasure system, which is the type of mine warfare with which the present invention is primarily concerned. This solution included a pontoon supported vehicle which could be remotely controlled from another vehicle, and which included apparatus for generating either or both an acoustic sweep or a magnetic field in the water which extended for some considerable distance beyond the vehicle. The acoustic sweep or magnetic field was of sufficient intensity to explode submerged mines having acoustically or magnetically responsive detonators while the vehicle was still out of range of the explosive force of the mine so that it suffered no damage. Unfortunately, the vehicle could travel at only a moderate speed, thereby impeding its ability to move quickly from one operational location to another; it had very limited maneuverability; and being in the water it was subject to underwater shock from exploding mines and therefore had to be operated at considerable distances from the mines, necessitating very high capacity acoustic sweep or magnetic field generating equipment.

BRIEF SUMMARY OF THE INVENTION

The present invention substantially alleviates, if not altogether eliminates, the disadvantages of prior known vehicles utilized in mine countermeasure warfare, particularly those utilized in underwater mine countermeasure warfare.

The present invention is an underwater mine warfare countermeasure system which includes an air cushion vehicle having a platform, a blower system mounted on the platform for discharging air into an air chamber located beneath the platform, an air retaining skirt attached to and surrounding the platform for retaining a cushion of air in the air chamber at sufficient pressure to support the vehicle above the surface on which it normally rests, and means mounted on the platform for propelling the vehicle in a given direction when the vehicle is supported by the cushion of air.

The mine warfare countermeasure system further includes an acoustic transmitter for projecting acoustic waves over an extended distance from the vehicle, the waves being capable of exploding mines having acoustic detonators. A hoist means is mounted on the upper surface of the vehicle platform for normally suspending the transmitter beneath the platform and for raising and lowering the transmitter between a storage position located just beneath the lower surface of the platform and an operative position which is submerged substantially beneath the vehicle. The hoist means is also operative to raise the transmitter through an access opening in the platform to the upper surface thereof for manual access to the transmitter.

The retraction apparatus also includes a pressure boundary means mounted on the platform over the opening therein for alternately normally providing an air seal between the upper and lower surfaces of the platform when the transmitter is disposed beneath the platform in either the aforementioned storage and operative positions, and exposing the access opening in the platform when the transmitter is being raised to the upper surface of the platform for access to the transmitter. Thus, the transmitter can be raised or lowered between the storage and operative positions and also suspended in either of these positions while maintaining sufficient air pressure beneath the air chamber to permit the vehicle to remain supported on the air cushion.

Several significant advantages are offered by the use of an air cushion vehicle over a floatation vehicle, whether of single or of multiple hull construction, such as greater maneuverability and speed, and, most importantly, the relative insensitivity of an air cushion vehicle to underwater shock. Relative high speeds in the order of 45 knots afford greatly decreased transit times in relocating from one operational zone to another, and the ability to operate in high seas further adds to the operational flexibility of the vehicle.

One critical operational requirement of an air cushion vehicle is maintaining the integrity of the air cushion while the vehicle is underway. Although the pressure of the air in the cushion required to support the vehicle is not great, it must be maintained within rather close limits, since too little pressure will not support the vehicle and too much pressure renders the vehicle unstable. Accordingly, it is essential that the air chamber be isolated from atmosphere as much as possible, except at the lower periphery of the skirt where the air inherently escapes during normal operation of the vehicle.

In order to take full advantage of the greatly increased speed capability of an air cushion vehicle, any apparatus which is suspended beneath it, such as the acoustic transmitter mentioned above, must be retracted from its operative position submerged beneath the vehicle and stored in a location just beneath the vehicle. This eliminates the drag on the vehicle, and also removes excessive strain on the transmitter towing mechanism, both of which would be imposed if the transmitter remained in its submerged operative position during transit of the vehicle at high speeds between different zones of operation. Thus, it is necessary to provide some means for raising and lowering the transmitter during normal operation of the vehicle without losing any air pressure from the air cushion.

It should be noted that, although the present invention is primarily intended for use in connection with underwater anti-mine warfare, the principles of the invention are applicable to other purposes of the vehicle, such as with SONAR detection systems and carrying unmanned underwater vehicles.

Having briefly described the general nature of the present invention, it is a principal object thereof to provide an underwater mine warfare countermeasure system which effectively alleviates or eliminates the disadvantages of prior known underwater mine warfare countermeasure systems, while at the same time retaining the significant advantages thereof.

Another object of the present invention is to provide an underwater mine warfare countermeasure system which utilizes an air cushion vehicle as the primary support vehicle for a system which explodes submerged mines without damage to the support vehicle.

Still another advantage of the present invention is to provide an underwater mine warfare countermeasure system which permits the air cushion vehicle to maintain normal operation while an acoustic transmitter is raised or lowered between operational and storage positions.

These and other objects and advantages of the invention will become more apparent from an understanding of the following detailed description of a presently preferred embodiment of the invention, when considered in conjunction with the accompanying drawings.

BRIEF DESCRIPTION OF THE DRAWINGS

FIG. 6 is a view similar to FIG. 5, but showing the transmitter in the access position.

DETAILED DESCRIPTION OF THE PREFERRED EMBODIMENT

Figure 1:
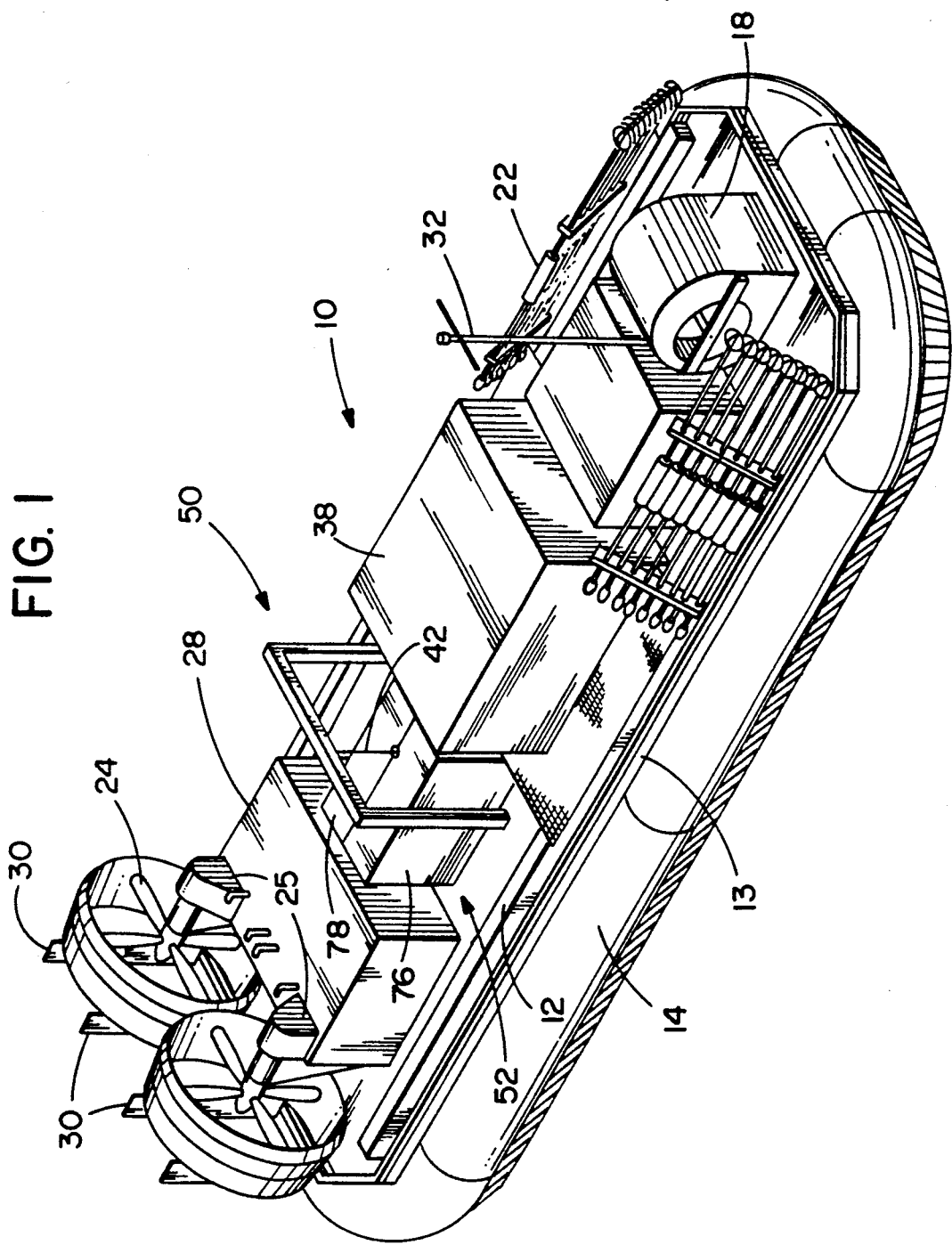
FIG. 1 is a perspective view of an air cushion vehicle incorporating the present invention.
Figure 2:
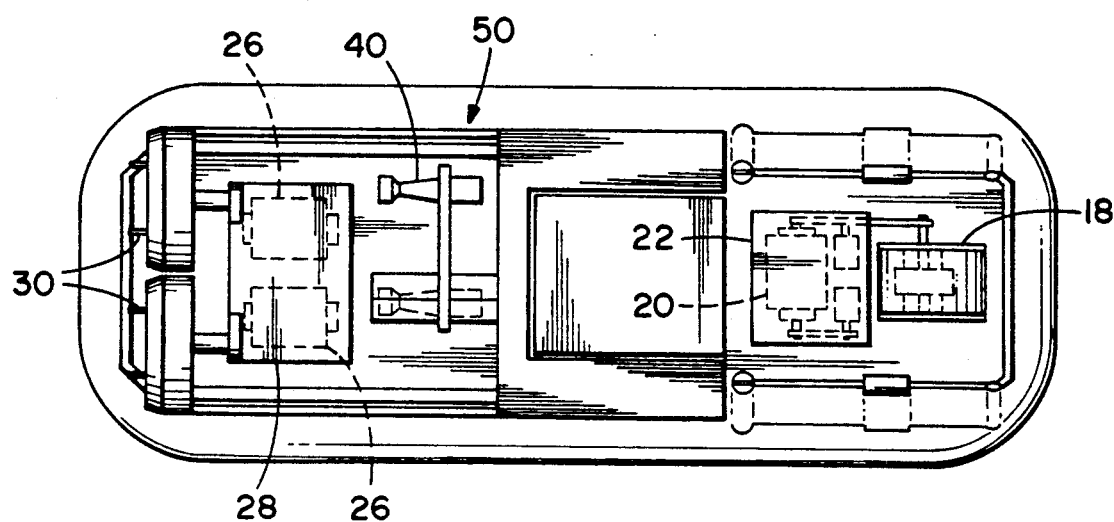
FIG. 2 is a plan view of the air cushion vehicle shown in FIG. 1.

Referring now to the drawings, and particularly to FIGS. 1 through 4 thereof, the invention comprises a remotely controlled air cushion vehicle generally designated by the reference numeral 10 The vehicle 10 is shown somewhat generally for illustrative purposes only and only those details of the vehicle which are necessary to an understanding of the invention are shown and described. Thus, the vehicle 10 comprises a platform 12 supported on a suitable hull 13 which constitutes the main structural hull of the vehicle. A peripheral skirt system 14 consisting of a bag of neoprene-coated nylon fabric is attached to the periphery of the platform 12 and extends downwardly therefrom to form an air chamber 16 (FIG. 5) between the underside of the platform 12 and any surface on which the vehicle is resting or over which it is traveling. The skirt system 14 provides a low drag interface with the surface at all speeds, whether over water, hard surfaces, or marsh, and lifts the vehicle high enough to provide obstacle clearances in rough terrain. It also provides pitch and roll stability to contribute to a good ride and avoid a plow-in condition.

Although several variations exist, the air cushion vehicle also includes a blower system which is designed to blow air downwardly through openings in the platform 12 to create an air cushion in the chamber 16 which has sufficient pressure to raise the vehicle above the surface on which it is resting. Thus, in the illustrated vehicle, a blower assembly 18 is mounted on the platform 12 in any suitable location and is driven by a suitable engine 20 mounted on the platform 12 within the housing 22 so as to blow a large volume of air downwardly, either directly through a large opening in the platform 12 or through an air distribution system within the platform 12 and skirt system 14 which distributes the air more uniformly than does a single large opening.

The vehicle is propelled in a forward direction by one or more propellers 24 mounted on supports 25 adjacent the rear end of the platform 12, the propellers being driven by any suitable engines 26 located within the housing 28. A plurality of aerodynamic rudders or vanes 30 are mounted rearwardly on the propellers and are pivotable about a vertical axis so as to direct the air stream from the propellers 22 toward either side of the vehicle for the purpose of steering the vehicle in either left or right directions. Finally, the vehicle 10 is provided with a suitable antenna 32 by which the vehicle 10 receives control signals 34 (FIG. 4) from a remote control vehicle generally designated by the numeral 36. The control components for operating all of the systems on the air cushion vehicle are located in the housing 38.

Figure 3:
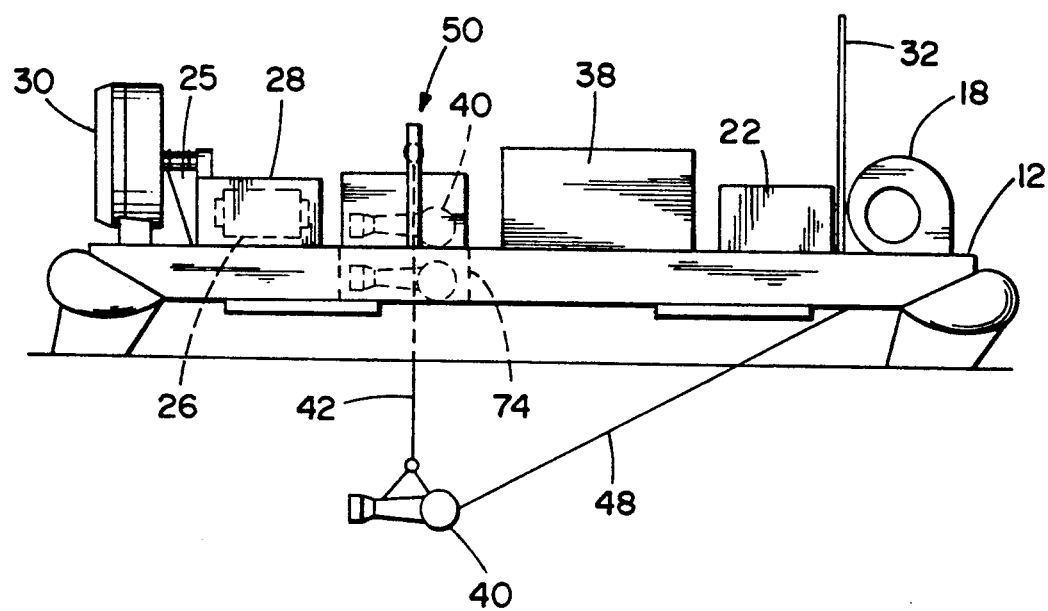
FIG. 3 is a side view of the air cushion vehicle shown in FIG. 1 with the acoustic transmitter shown in solid lines in the deployed or operational position, and in dotted lines in the storage and access positions.
Figure 5:
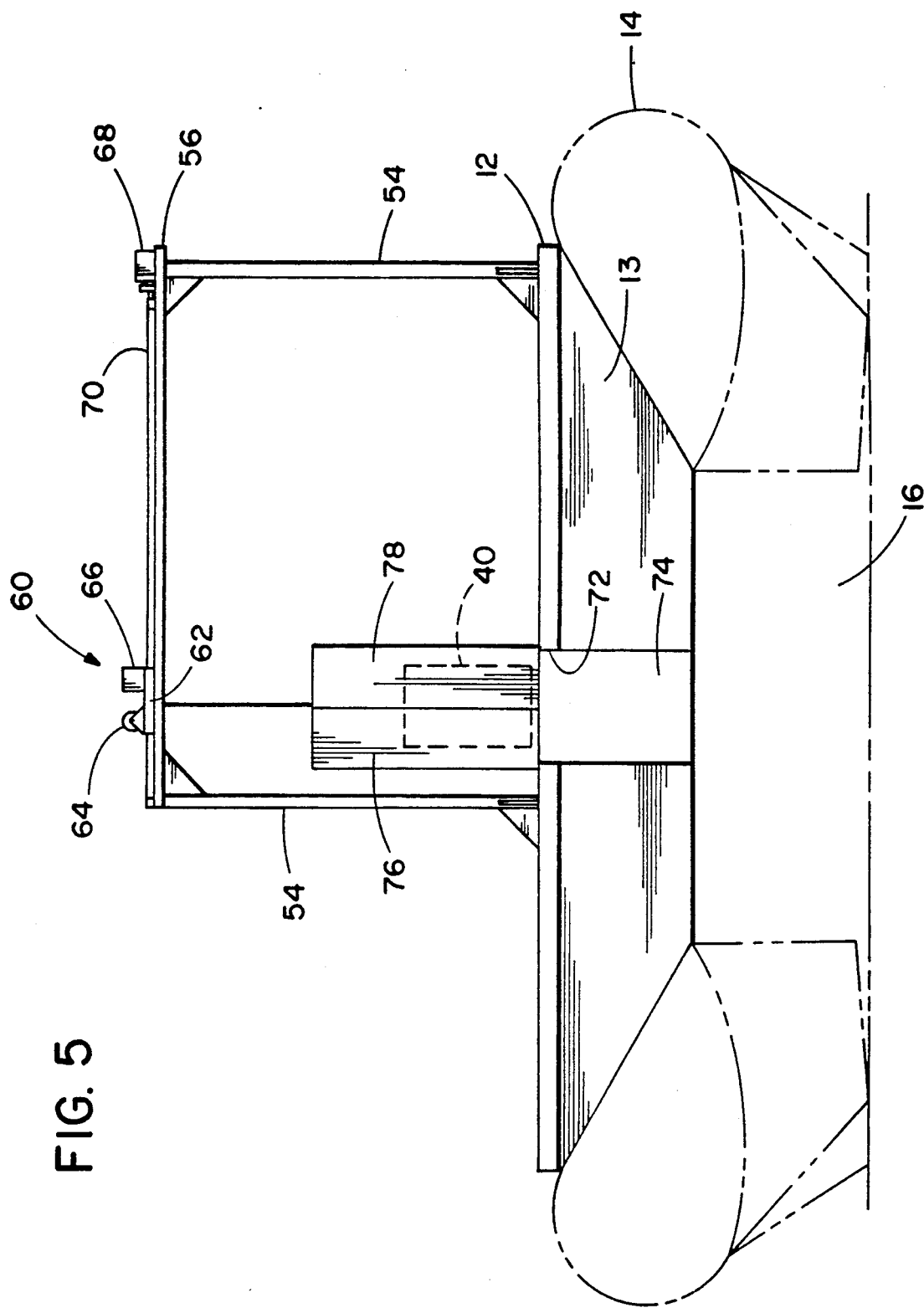
FIG. 5 is a sectional view of FIG. 3.

As best seen in FIGS. 3 and 5, an acoustic transmitter 40 is suspended beneath the lower surface of the platform 12 by means of a lifting cable 42 by which the transmitter 40 is deployed and retracted in a manner described below. For the purpose of the present invention, and with reference to FIG. 5, it is only necessary to understand that the transmitter 40 is capable of emitting an acoustic wave pattern 44 which is detected by an acoustically responsive detonator in a mine 46 so as to detonate the mine while the vehicle 10 is well out of range of the explosive force of the mine. A tow cable 48 is connected to the front of the transmitter 40 and to a point adjacent the front end of the vehicle 10 to provide a steady pull in the forward direction of the vehicle and transmitter to insure that the transmitter follows a straight path.

From the foregoing description, it will be apparent that the air cushion vehicle 10 can be maneuvered from the control ship 36 to any desired area, within the range of the control signal system, where it is suspected that mines are present, and mines with acoustic detonators can be exploded merely by directing the air cushion vehicle into sufficiently close proximity to actuate the detonators.

Figure 4:
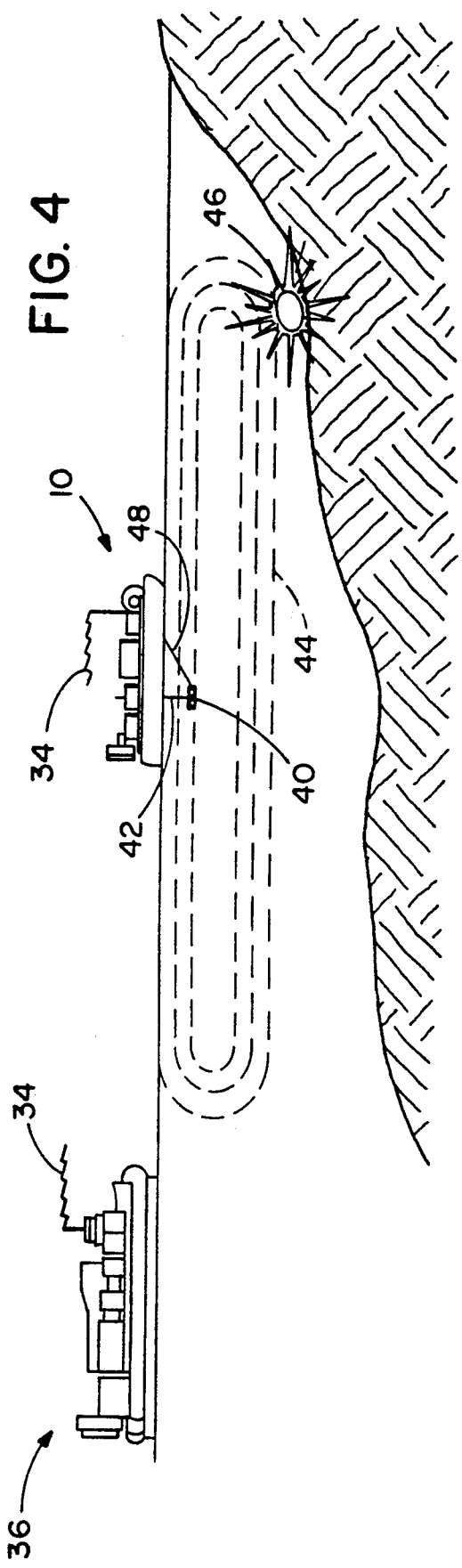
FIG. 4 is an illustration of the manner in which the air cushion vehicle is controlled remotely from a control vehicle, and the acoustic wave pattern is generated to explode mines.

As indicated above, there are times when it is desired to retract the transmitter 40 from the deployed position shown in FIG. 4 either to the storage position or the access position. This is accomplished by the transmitter retraction apparatus now to be described. With reference to FIGS. 1 through 3, 5 and 6, the apparatus comprises two basic systems, first a retraction assembly, generally designated by the reference numeral 50, by which the transmitter is normally suspended beneath the platform 12 and is raised and lowered between the storage position and the operative position, and is also raised through the platform to the maintenance position; and secondly an air seal or pressure boundary assembly, generally designated by the reference numeral 52, which prevents undue escape of air from the air chamber 16 while the transmitter 40 is being raised and lowered during normal operations.

In the embodiment of the invention as illustrated in the drawings, the retracting assembly 50 comprises a pair of upstanding support members 54 suitably mounted on the platform 12, and a cross member 56 connected to the upper ends of the support members 54. The upper surface of the cross member 56 defines a slide or rail along which a hoist assembly, generally designated by the numeral 60, can slide from one end of the cross member 56 to the other. The hoist assembly 60 comprises a base 62 supporting a winch 64 and a motor 66 to drive the winch. A stationary motor 68 is mounted on one end of the cross member 56 and drives a screw 70 which extends the length of the cross member 56 and through the base 62 of the hoist assembly 60. The base 62 is threaded correspondingly to the screw 70, so that upon rotation of the screw 70 by the motor 68, the hoist assembly 60 will move from one end of the cross member to the other.

The platform 12 is provided with an access opening 72 of suitable dimensions to permit the transmitter 40 to pass therethrough, and which communicates with the interior of a well 74 formed in the hull 13 and having at least the same dimensions as the opening 72. The lift cable 42, which is connected to the winch 64, passes through the opening 72 and the well 74 to support the transmitter 40 and to raise and lower it between the operative, storage and access positions as best seen in FIG. 3. The lowermost solid line position of the transmitter 40 is the operative position, which is also shown in FIG. 4. The lower dotted line position of the transmitter 40 is the storage position which is within the well 74, and the upper dotted line position is the access position, which is above the platform 12 and disposed away from the opening 72, as seen in FIG. 6.

As indicated previously in the Brief Summary of the Invention, it is apparent that the air cushion vehicle 10 could not operate normally with the opening 72 in the platform exposed to atmosphere, since the volume of air that would escape from the air chamber 16 through the opening 72 would prevent the build-up of sufficient air pressure in the chamber 16 to support the vehicle. Accordingly, the air seal or pressure boundary assembly 52 maintains the air chamber 16 effectively sealed from the atmosphere during normal operations of the air cushion vehicle, but at the same time permits access to the opening 72 when it is necessary to perform maintenance work on the transmitter, or to remove it altogether from the vehicle. Thus, in the preferred embodiment, the air seal assembly 52 is seen to comprise a box-like housing connected to the platform 12 and which overlies the opening 72 and the well 74. The housing comprises a pair of half housing members 76 and 78 (FIGS. 1 and 5), both of which are connected in an air-tight manner to the platform 12 by any suitable sealing means interposed between the platform 12 and the half housings 76 and 78 for normally sealing the opening 72 from the atmosphere when the half housings 76 and 78 are in their normal position as seen in FIG. 5, and are secured in this position by any suitable connecting devices which both maintain the air-tight seal between the platform 12 and the housing members 76 and 78 and also permit the housing members to be removed from the position shown in FIGS. 1 and 5. In normal operation, the housing member 76 would remain in the position shown in FIGS. 1 and 5, and only the housing member 78 would be removed to permit movement of the transmitter from the position over the well 74 shown in FIG. 5 to the access position shown in FIG. 6.

Figure 8:
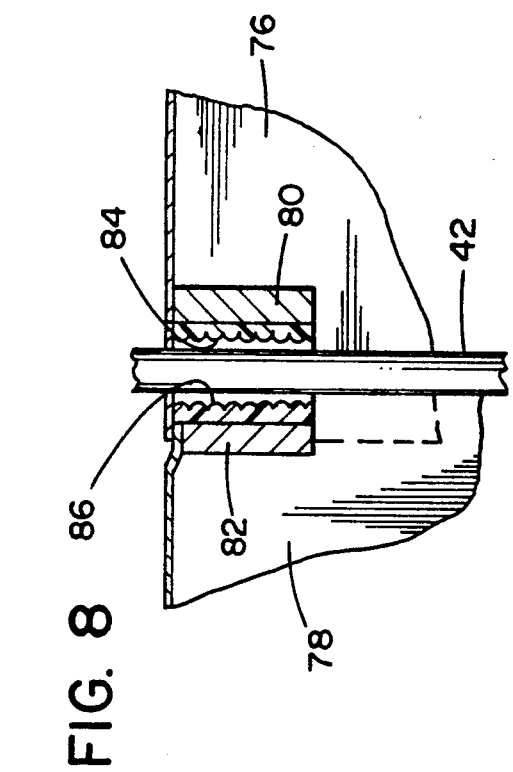
FIG. 8 is a sectional view taken on the line 8—8 of FIG. 7.
Figure 7:
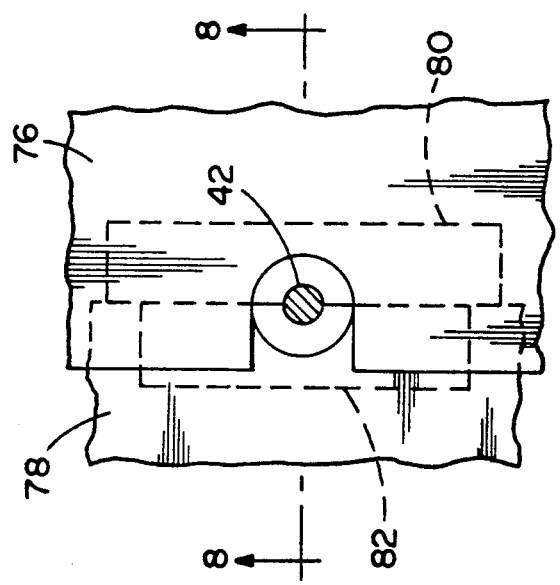
FIG. 7 is a fragmentary view drawn to an enlarged scale showing the detail of the lift cable seal.

In order to limit the escape of air from the air chamber 16 to an acceptable level during normal operations, the housing members 76 and 78 are provided with suitable labyrinth-type sealing members 80 and 82 (FIGS. 7 and 8) which are affixed to the upper inner surfaces of the housing members 76 and 78 respectively, the sealing members having recesses 84 and 86 which permit the lifting cable 42 (and any necessary power cables) to pass through the sealing members during deployment and retraction of the transmitter 40. While the specific construction of the sealing members 76 and 78 is not critical to the invention, it is expected that they would be formed of a low friction material such as TEFLON.

From the foregoing description, the operation of the invention should be apparent. With the transmitter 40 in the operative position as shown in FIGS. 3 and 4, the air cushion vehicle 10 can be maneuvered as desired from the control vehicle 36 to explode mines 46 as described above. When it is desired to move the air cushion vehicle 10 from one area of operation to another, without the transmitter in operation, the winch 64 is operated to raise the transmitter from the operative position to the storage position in the well 74, as shown in FIG. 3, from which it can be deployed back to the operative position at any time merely by reversing the direction of the winch 64. During this operation, the cable 42 passes freely through the sealing members 80 and 82.

However, when it is desired to raise the transmitter 40 above the platform 12 and dispose it in the access position, the transmitter 40 is raised through the opening 72 to the position shown in FIG. 5, and the housing member 78 is removed from its normal position. Thereafter, the motor 68 is operated to turn the screw 70 in the appropriate direction to move the base 62 along the rail on the cross member 56, which in turn moves the transmitter from the FIG. 5 position to that shown in FIG. 6. Of course, during this operation, the air cushion vehicle will not operate in the normal manner because of the undue escape of air from the air chamber 16 through the opening 72; in actual practice, the air cushion vehicle is normally shut down prior to opening the pressure boundary 52 and the vehicle remains off-cushion during the transmitter transfer operation. Once the transmitter has been placed in the access position, the housing member 78 is replaced to reestablish the pressure boundary 52, and the air cushion vehicle can resume normal operation.

It should be understood that the foregoing description and accompanying drawings show the invention in the environment for which it was primarily intended and for which it is especially adapted. However, the principles of the invention have application and utility beyond the environment described and shown and should not be construed as limited to that environment. For example, the transmitter 40 is merely one form of an operating tool which could be suspended from the air cushion vehicle 10 and which could be replaced by other tools for entirely different purposes than that disclosed hereinabove, such as a sonar transmitter for tracking the location of submerged submarines. In addition, the principles of the invention are also applicable to the use of such operating tools with the air cushion vehicle operating over land rather than water, where, for example, the air cushion vehicle could be utilized for fertilizing large areas of farmland by deploying a suspended spraying implement. Other examples of such alternate use of the air cushion vehicle would be taking soil of ice samples over land or tundra.

We claim:

1. An underwater mine warfare countermeasure system comprising:
   A. an air cushion vehicle having
      1. a platform,
      2. means mounted on said platform for discharging air into an air chamber located beneath said platform,
      3. an air retaining skirt attached to and surrounding said platform for retaining a cushion of air in said air chamber at sufficient pressure to support the vehicle above the surface of the water, and
      4. means mounted on said platform for propelling the vehicle in a given direction when the vehicle is supported by the cushion of air,
   B. an acoustic transmitter for projecting acoustic waves over an extended distance, said acoustic waves being capable of exploding mines having acoustic detonators,
   C. retracting means mounted on the upper surface of said platform for normally suspending said transmitter beneath said platform and for raising and lowering said transmitter between a storage position adjacent the lower surface of said platform and an operative position spaced beneath said lower surface of said platform, and for raising said transmitter through an access opening in said platform to the upper surface thereof for manual access to said transmitter, and
   D. pressure boundary means mounted on said platform over said opening for alternately normally providing an air seal between the upper and lower surfaces of said platform when said transmitter is disposed beneath said platform in either of said storage or operative positions, and exposing said access opening in said platform through which said transmitter passes when being raised to said upper surface of said platform for access to said transmitter, whereby said transmitter can be raised or lowered between said storage and operative positions and suspended in either of said positions while maintaining sufficient air pressure in said air chamber to permit said vehicle to remain supported on said air cushion.

2. An underwater mine warfare countermeasure system as set forth in claim 1 wherein said retracting means comprises:
   A. an upstanding frame mounted on said platform, said frame including a horizontal rail which extends laterally across a portion of said platform, and
   B. hoist means on said frame for both raising and lowering said transmitter and for moving said transmitter laterally across said platform when said transmitter is raised above said platform.

3. An underwater mine warfare countermeasure system as set forth in claim 2 wherein said hoist means comprises:
   A. a winch mounted on said rail for raising and lowering said transmitter, and
   B. means mounted on said rail for moving said winch back and forth along said rail so as to move said transmitter to an access position on the upper surface of said platform spaced laterally from said opening in said platform.

4. An underwater mine warfare countermeasure system as set forth in claim 1 wherein said pressure boundary means comprises:
   A. a housing disposed over said access opening in said platform,
   B. sealing means interposed between said housing and said platform for normally sealing said opening from the atmosphere, and
   C. means permitting removal of a portion of said housing to expose said access opening in said platform and permit said transmitter to be lifted therethrough.

5. An underwater mine warfare countermeasure system as set forth in claim 4 wherein said housing is formed as a pair of half housing members removably secured to the upper surface of said platform, the removal of one of which members is sufficient to expose said access opening for vertical movement and lateral displacement of said transmitter.

6. An underwater mine warfare countermeasure system as set forth in claim 5 wherein each of said half housing members is provided with a recess in the top wall thereof which forms an aperture when both half housing members are in their normal position through which a lift cable extends to support said transmitter beneath said platform.

7. An underwater mine warfare countermeasure system as set forth in claim 6 wherein said sealing means is disposed on the under surface of the top wall of said housing, said sealing means being effective to prevent the escape of air through said lift cable aperture while permitting said lift cable to pass freely therethrough during normal operations of said air cushion vehicle.

8. In combination with an air cushion vehicle having a platform, means mounted on the platform for discharging air into an air chamber located beneath the platform, an air retaining skirt attached to and surrounding the platform for retaining a cushion of air in the air chamber at sufficient pressure to support the vehicle above the surface on which it normally rests, and means mounted on the platform for propelling the vehicle in a given direction when the vehicle is supported by the cushion of air, an operating tool retraction apparatus carried by the vehicle for deploying and retracting the operating tool while normally suspended beneath the platform of the vehicle and occasionally for disposing the tool on the upper surface of the vehicle platform, said apparatus comprising:
  A. an operating tool,
  B. retracting means mounted on the upper surface of the platform for normally suspending said tool beneath the platform and for raising and lowering said tool between a storage position adjacent the lower surface of the platform and an operative position spaced beneath said lower surface of the platform, and for raising said tool through an access opening in the platform to the upper surface thereof for manual access to said tool, and
  C. pressure boundary means mounted on the platform over said access opening for alternately normally providing an air seal between the upper and lower surfaces of the platform when said tool is disposed beneath the platform in either of said storage or operative positions, and exposing said access opening in the platform through which said tool passes when being raised to said upper surface of the platform for manual access to said tool, whereby said tool can be raised or lowered between said storage and operative positions and suspended in either of said positions while maintaining sufficient air pressure in said air chamber to permit said vehicle to remain supported on said air cushion.

* * * * *